United States Patent
Chen (10) Patent No.: US 6,882,871 B2
(45) Date of Patent: Apr. 19, 2005

(54) TRANSFER CONNECTION DEVICE FOR WIRELESSLY CONNECTING MOBILE PHONE AND HAND-FREE HANDSET

(75) Inventor: Tonny Chen, Chang-Hua (TW)

(73) Assignee: E-Lead Electronic Co, Ltd., Chang-hua (TW)

(*) Notice: Subject to any disclaimer, the term of this patent is extended or adjusted under 35 U.S.C. 154(b) by 599 days.

(21) Appl. No.: 09/987,068

(22) Filed: Nov. 13, 2001

(65) Prior Publication Data

US 2003/0092472 A1 May 15, 2003

(51) Int. Cl.[7] .............................. H04B 7/00; H04B 1/00
(52) U.S. Cl. ..................... 455/569.1; 455/41.3; 455/42; 455/43
(58) Field of Search ........................... 455/569.1, 569.2, 455/11.1, 41.2, 41.3

(56) References Cited

U.S. PATENT DOCUMENTS

| | | | | |
|---|---|---|---|---|
| 5,526,405 A | * | 6/1996 | Toda | 455/569.1 |
| 5,913,163 A | * | 6/1999 | Johansson | 455/426.1 |
| 6,078,825 A | * | 6/2000 | Hahn et al. | 455/569.2 |
| 6,594,366 B1 | * | 7/2003 | Adams | 381/74 |
| 2003/0036414 A1 | * | 2/2003 | Huang | 455/569 |

* cited by examiner

Primary Examiner—George Eng
Assistant Examiner—Tuan Pham
(74) Attorney, Agent, or Firm—Troxell Law Office, PLLC (57) ABSTRACT

A transfer connection device for wirelessly connecting mobile phone and hand-free handset has a first connector and a second connector to respectively couple with a hand-free handset and a mobile phone to allow signal transmission between the hand-free handset and mobile phone accomplished in a wireless fashion without the tangle and inconvenience of physical linking line between the mobile phone and the hand-free handset.

2 Claims, 9 Drawing Sheets

FIG. 9

TRANSFER CONNECTION DEVICE FOR WIRELESSLY CONNECTING MOBILE PHONE AND HAND-FREE HANDSET

BACKGROUND OF THE INVENTION

1. Field of the Invention

The invention relates to a transfer connection device for wirelessly connecting mobile phone and hand-free handset that has a first connector and a second connector to couple respectively with a hand-free handset and a mobile phone to communicate control signals therebetween without physical lines.

2. Description of the Prior Art

Figure 1:
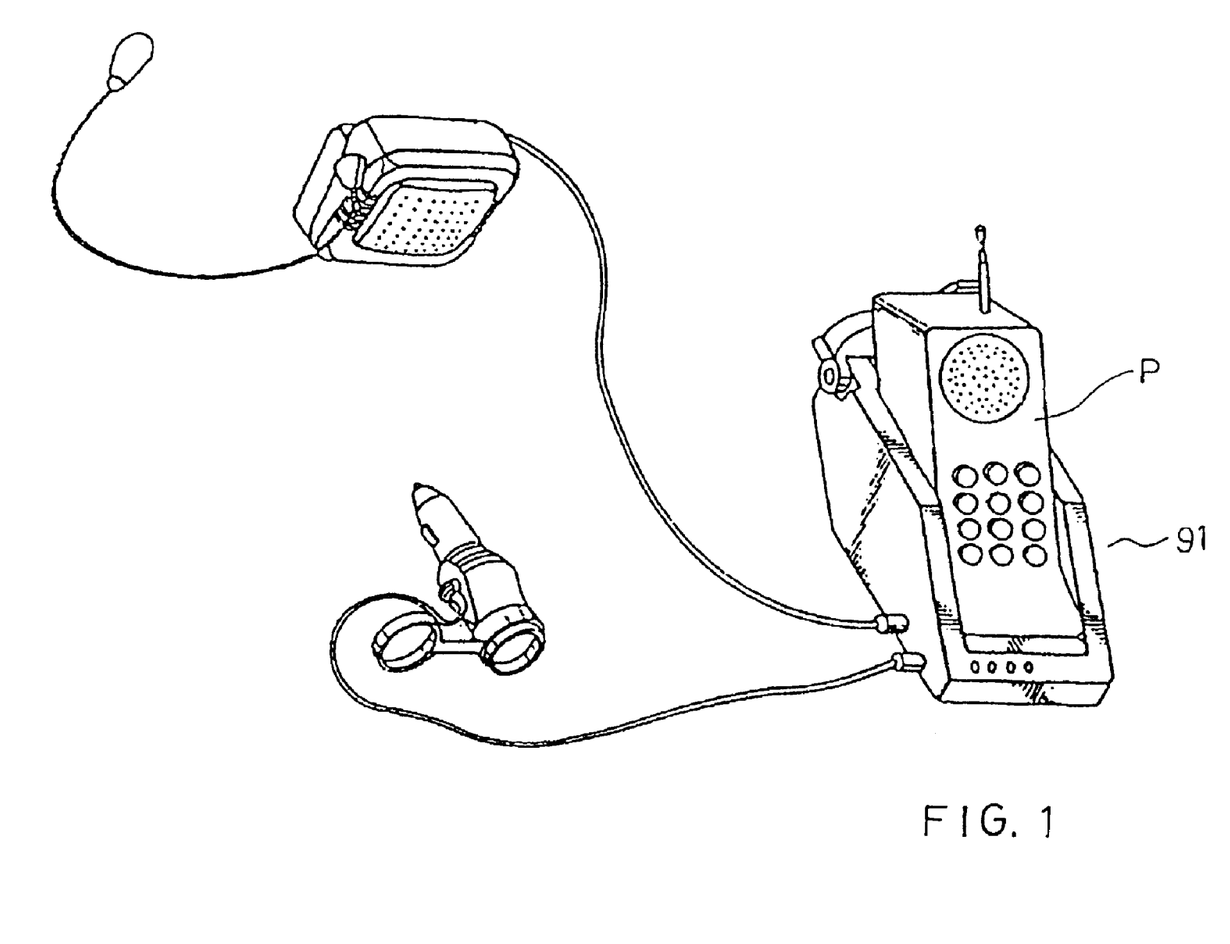
FIG. 1 is a schematic view of a conventional hand-free handset.
Figure 2:
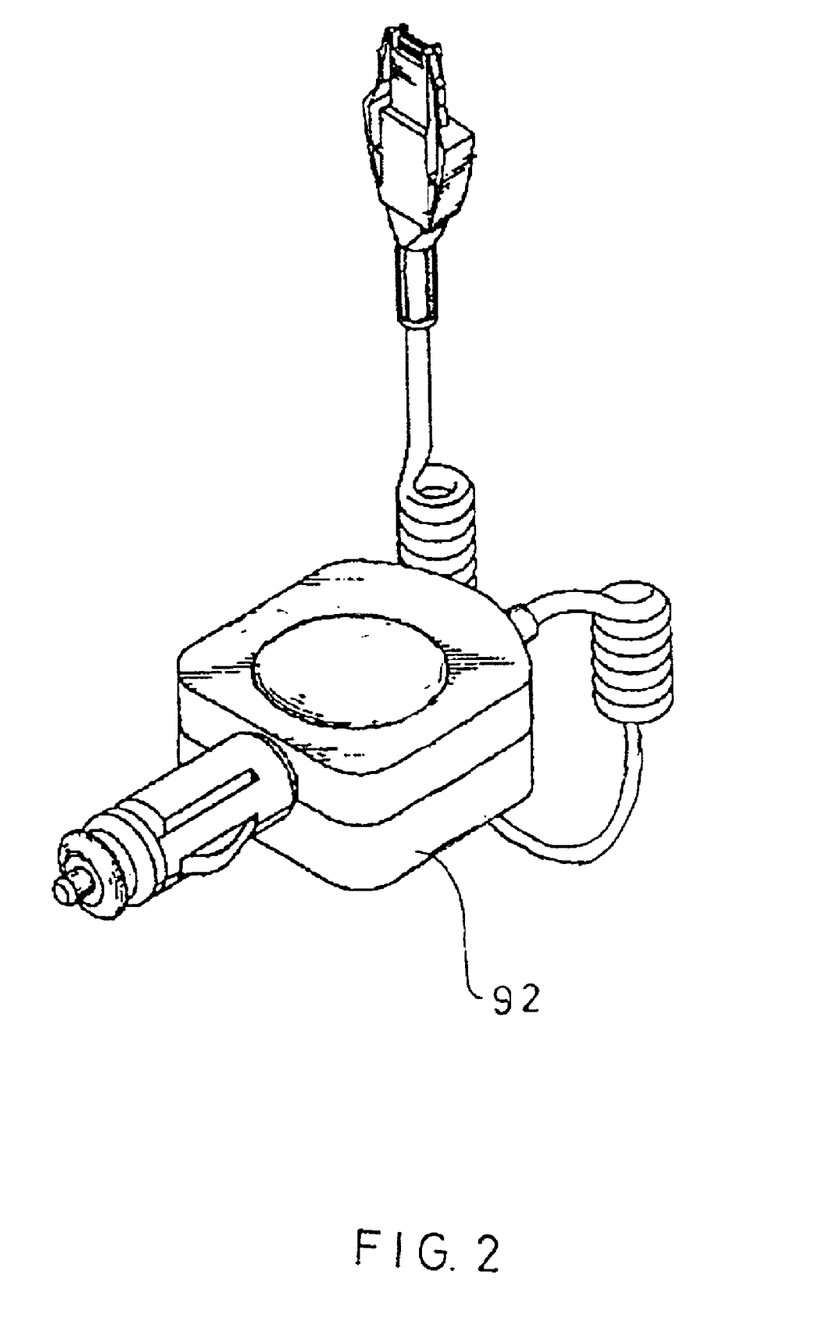
FIG. 2 is a schematic view of another conventional hand-free handset.

Deregulation of telecommunication industry has made mobile phones very popular nowadays. The peripheral communication devices to couple with mobile phones also are flourishing. Conventional hand-free handsets such as the ones marked by 91, 92 shown in FIGS. 1 and 2 usually have a hand-free body 91 to connect the mobile phone P with a line linking between them. The line restricts the mounting locations of the hand-free body and mobile phone, and also makes the crowd dashboard even more messy in the cars.

SUMMARY OF THE INVENTION

In view of aforesaid disadvantages, it is a primary object of the invention to provide a transfer connection device for wirelessly connecting mobile phone and hand-free handset that has a first connector and a second connector to couple respectively with a hand-free handset and a mobile phone to allow signal transmission between the hand-free handset and the mobile phone accomplished in a wireless fashion without the tangle and inconvenience of physical linking line.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 3:
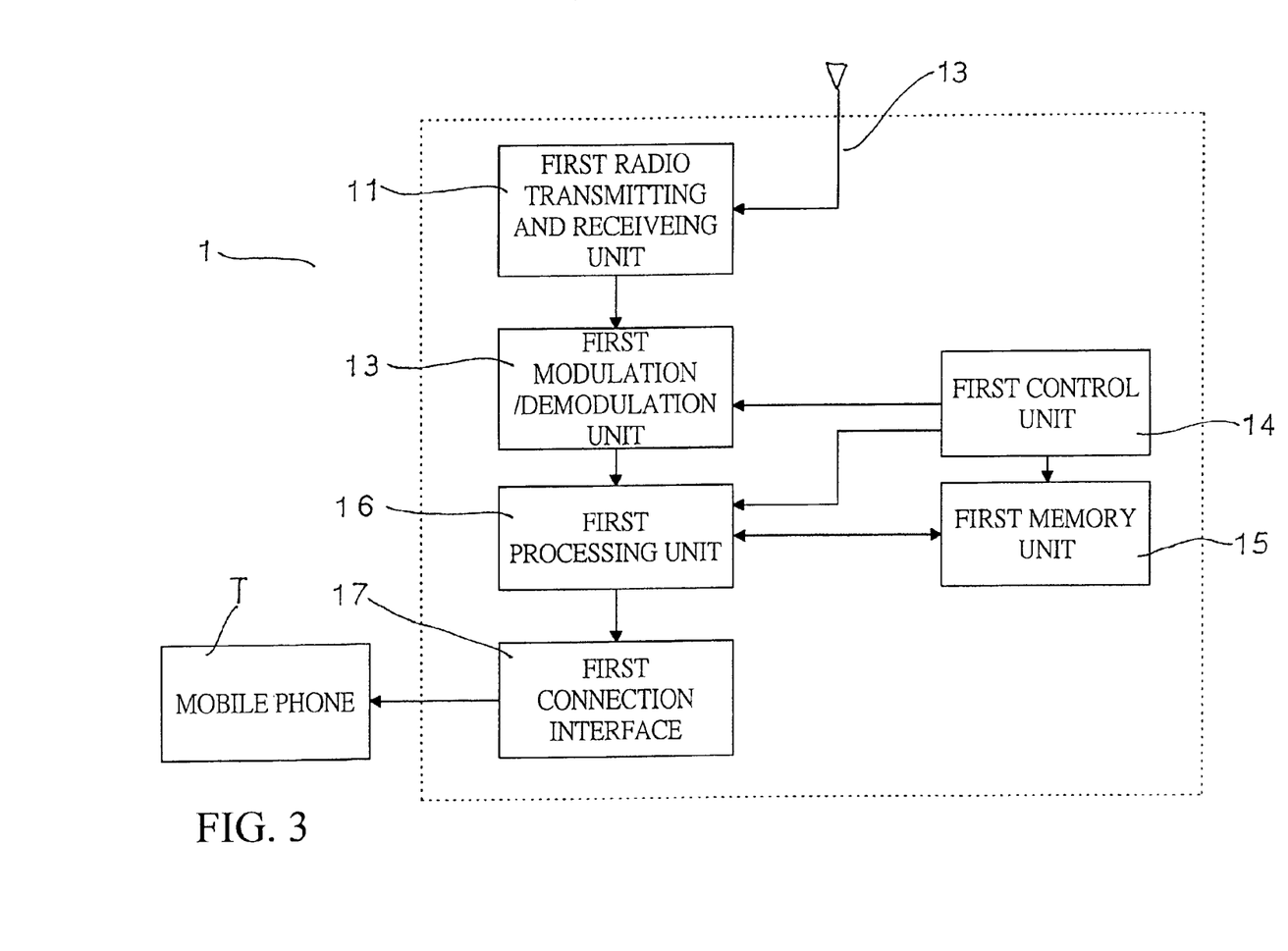
FIG. 3 is a block diagram of a first connector of the invention.
Figure 4:
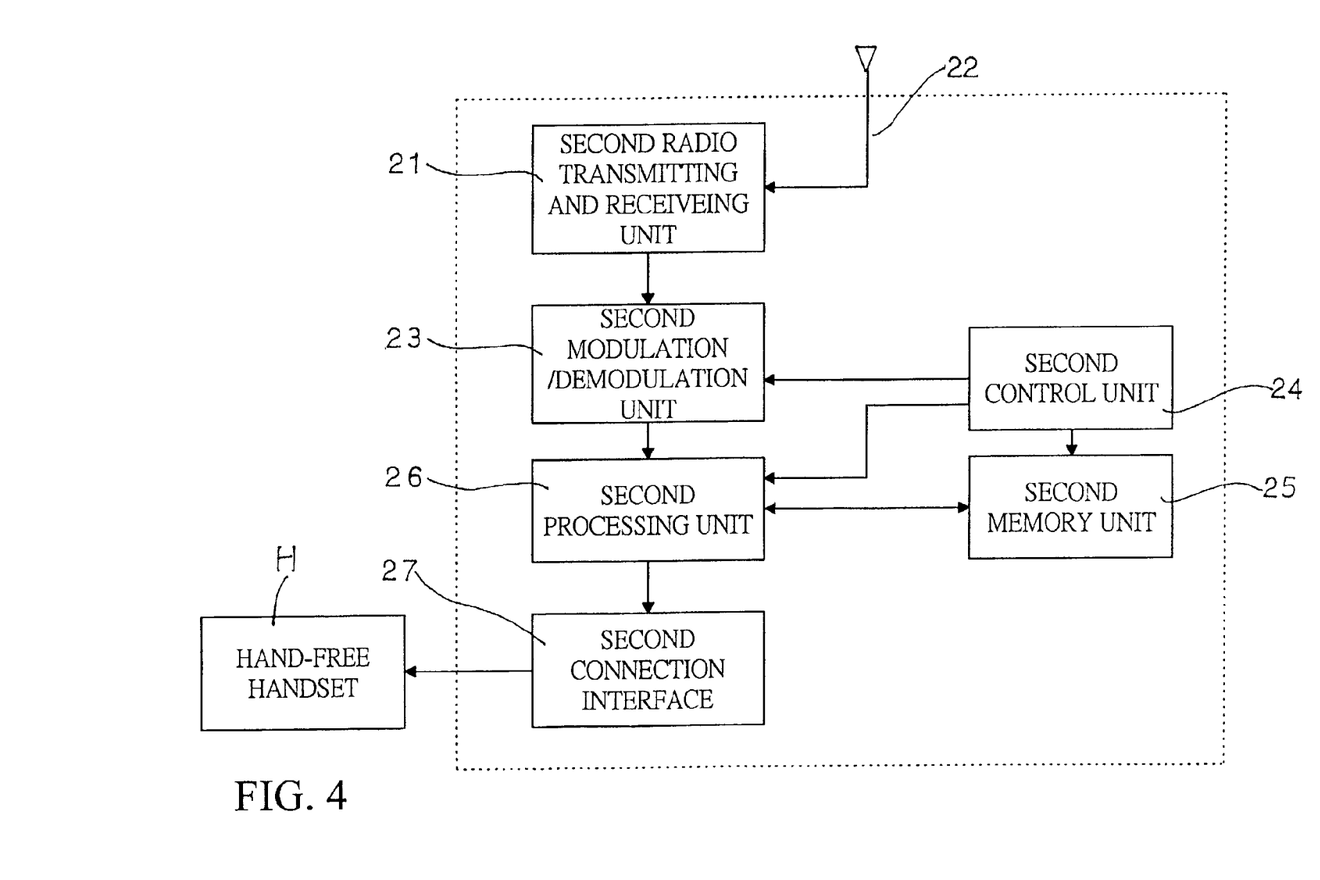
FIG. 4 is a block diagram of a second connector of the invention.

Referring to FIGS. 3 and 4, the invention mainly consists of a first connector 1 and a second connector 2 to couple respectively with a mobile phone T and a hand-free handset device H. The first connector 1 includes a first radio transmitting and receiving unit 11, a first antenna 12, a first modulation/demodulation unit 13, a first control unit 14, a first memory unit 15, a first processing unit 16, and a first connection interface 17.

The first radio transmitting and receiving unit 11 is controlled by the first control unit 14 to receive radio signals from the second connector 2 and to emit signals output by the first modulation/demodulation unit 13 through the first antenna 12 to the second connector 2.

The first antenna 12 receives and transmits radio signals.

The first modulation/demodulation unit 13 is controlled by the first control unit 14 to modulate output signals from the first processing unit 16 and transfer to the first radio transmitting and receiving unit 11, and also to demodulate radio signals received from the first radio transmitting and receiving unit 11 and transfer to the first processing unit 16.

The first control unit 14 controls and coordinates all other units in the first connector 1.

The first memory unit 15 stores set values of the first connector 1 and temporarily stores the received and transmitted radio signals.

The first processing unit 16 is controlled by the first control unit 14 for processing audio voice and control data of the mobile phone T and transferring to the first modulation/demodulation unit 13.

The first connection interface 17 allows the signal terminal of the mobile phone T to connect with the first connector, and may be a signal line, a socket, and the like.

The second connector 2 includes a second radio transmitting and receiving unit 21, a second antenna 22, a second modulation/demodulation unit 23, a second control unit 24, a second memory unit 25, a second processing unit 26, and a second connection interface 27.

The second radio transmitting and receiving unit 21 is controlled by the second control unit 24 to receive radio signals from the first connector 1 and to emit signals output by the second modulation/demodulation unit 23 through the second antenna 22 to the first connector 1.

The second antenna 22 receives and transmits radio signals.

The second modulation/demodulation unit 23 is controlled by the second control unit 24 to modulate output signals from the second processing unit 26 and transfer to the second radio transmitting and receiving unit 21, and also to demodulate radio signals received from the second radio transmitting and receiving unit 21 and transfer to the second processing unit 26.

The second control unit 24 controls and coordinates all other units in the second connector 2.

The second memory unit 25 stores set values of the second connector 2 and temporarily stores the received and transmitted radio signals.

The second processing unit 26 is controlled by the second control unit 24 for processing audio voice and control data of the hand-free handset H and transferring to the second modulation/demodulation unit 23.

The second connection interface 27 allows the hand-free handset H to connect with the second connector, and may be a signal line, a socket, and the like.

Figure 9:
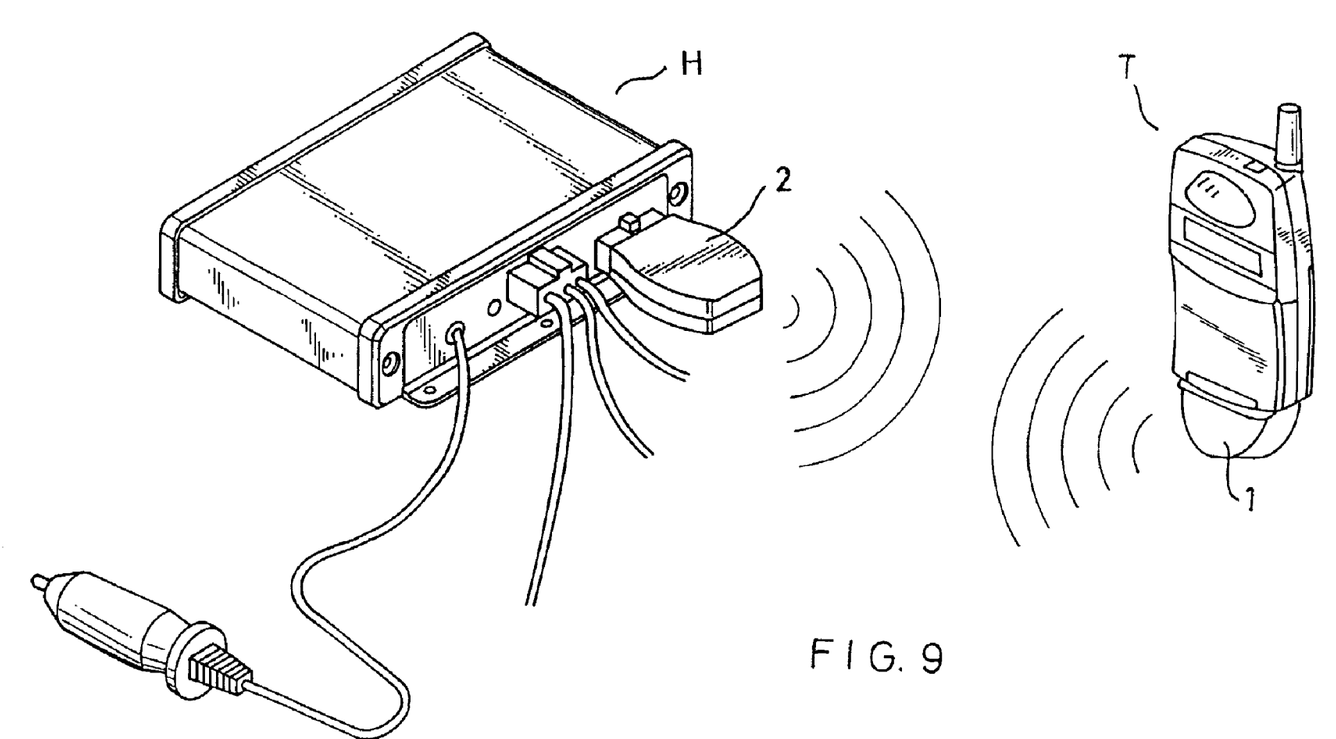
FIG. 9 is a schematic view of an embodiment of the invention.

When in use, the first connector 1 and second connector 2 are connected respectively to the mobile phone T and hand-free handset H for the two to communicate in a wireless fashion (as shown in FIG. 9).

FIGS. 5 through 8 illustrate operation flow of the first and second connector that will be discussed below.

Figure 5:
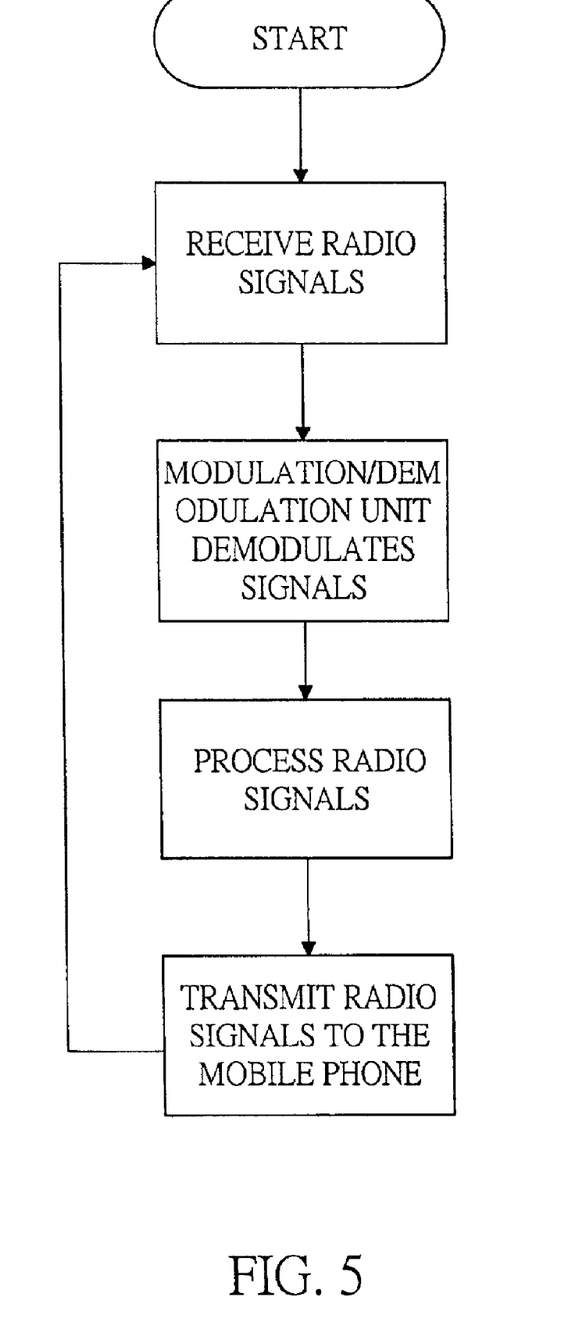
FIG. 5 is an operation flow chart of the first connector performing radio receiving process.

Referring to FIG. 5 for receiving operations of the first connector:

1. Start.
2. The first radio transmitting and receiving unit 11 receives radio signals through the first antenna 12 and transmits to the first modulation/demodulation unit 13.
3. The first modulation/demodulation unit 13 demodulates the received radio signals and transmits the signals to the first processing unit 16.
4. The first processing unit 16 processes the demodulated radio signals and through the first connection interface 17 transmits the radio signals (i.e. hand-free handset H signals) to the mobile phone T.
5. Return to Step 2.

Figure 6:
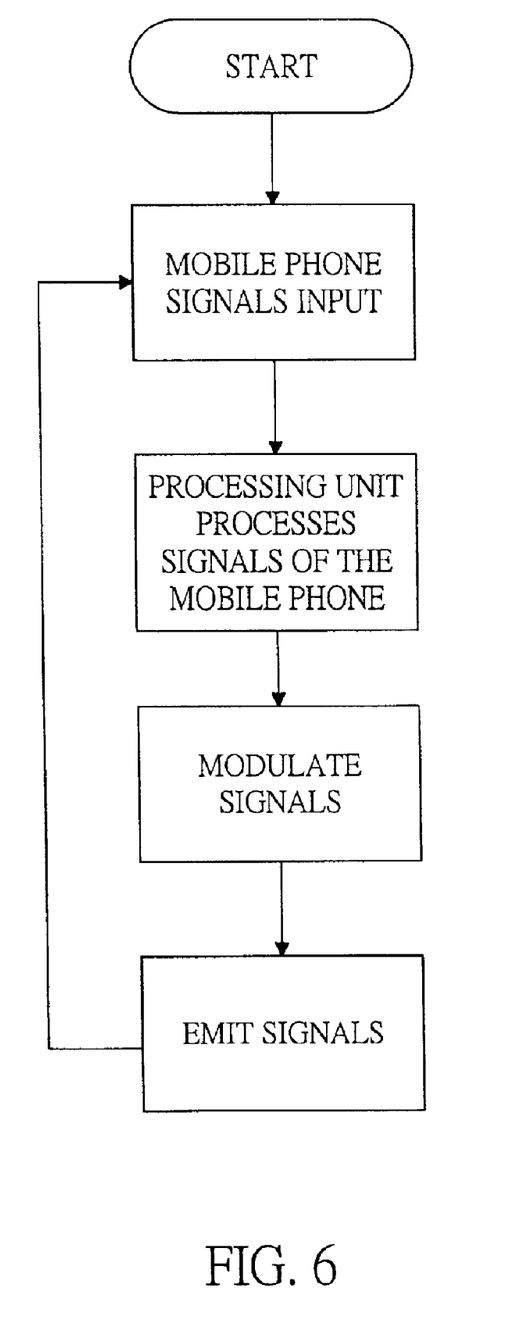
FIG. 6 is an operation flow chart of the first connector performing radio emitting process.

Referring to FIG. 6 for emitting operations of the first connector:

6. Start.
7. The mobile phone T transmits radio signals through the first connection interface 17 to the first processing unit 16.
8. The first processing unit 16 processes the signals of the mobile phone T and transmits to the first modulation/demodulation unit 13.
9. The first modulation/demodulation unit 13 modulates the signals transmitted from the first processing unit 16 and transmits to the first radio transmitting and receiving unit 11.
10. The first radio transmitting and receiving unit 11 emits the modulated signals through the first antenna 12.
11. Return to Step 7.

Figure 7:
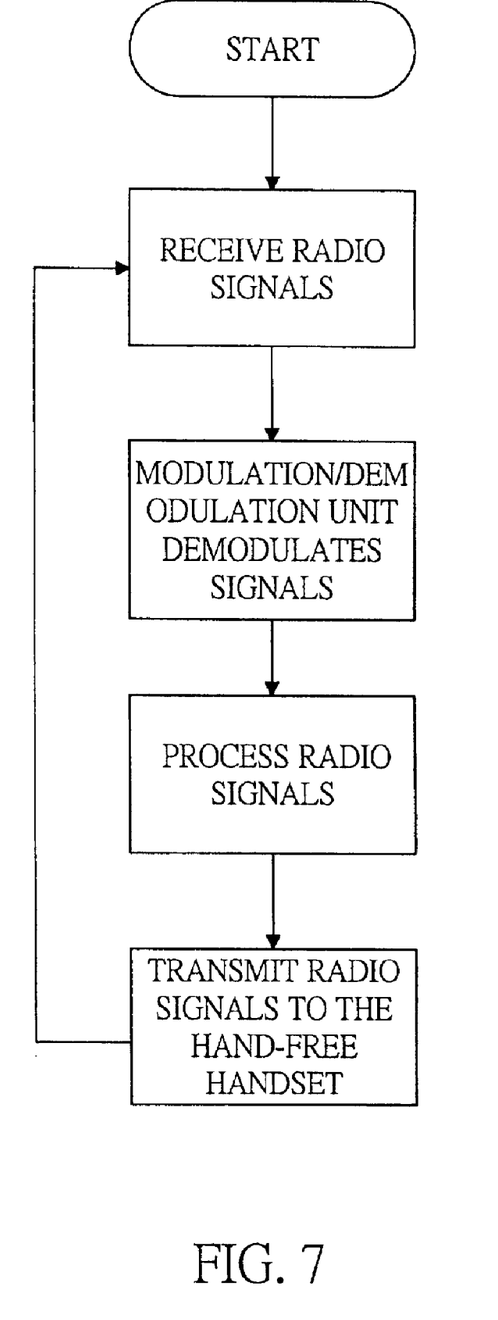
FIG. 7 is an operation flow chart of the second connector performing radio receiving process.

Referring to FIG. 7 for receiving operations of the second connector:

12. Start.
13. The second radio transmitting and receiving unit 21 receives radio signals through the second antenna and transmits to the second modulation/demodulation unit 23.
14. The second modulation/demodulation unit 23 demodulates the received radio signals and transmits the signals to the second processing unit 26.
15. The second processing unit 26 processes the demodulated radio signals and through the second connection interface 27 transmits the radio signals to the hand-free handset H.
16. Return to Step 13.

Figure 8:
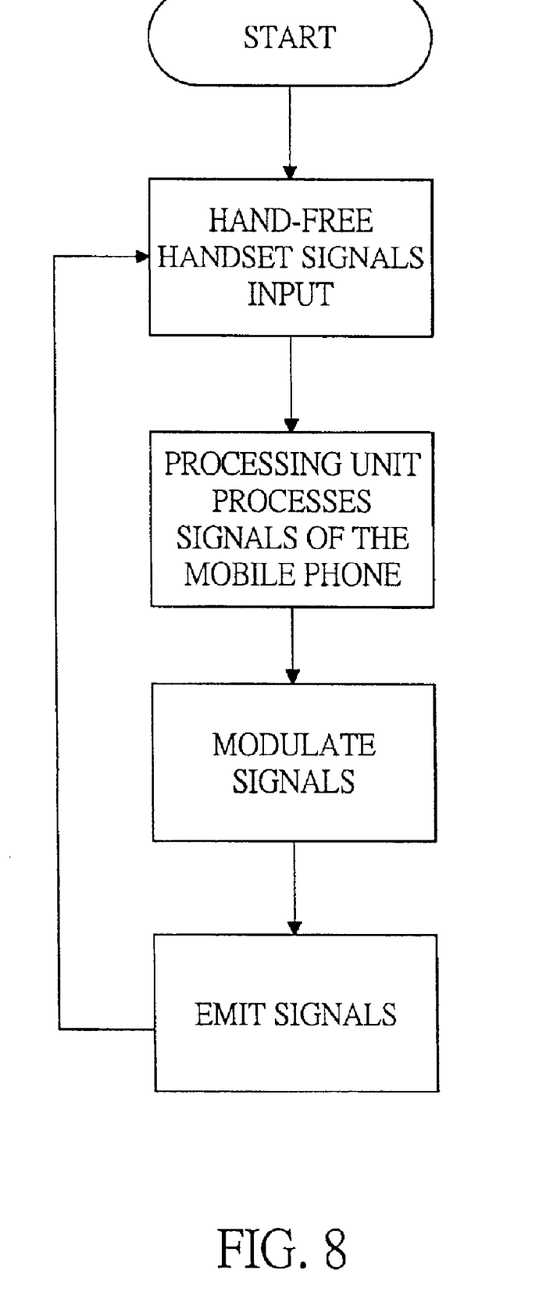
FIG. 8 is an operation flow chart of the second connector performing radio emitting process.

Referring to FIG. 8 for emitting operations of the second connector:

17. Start.
18. The mobile phone T transmits radio signals through the second connection interface 27 to the second processing unit 26.
19. The second processing unit 26 processes the signals of the hand-free handset H and transmits to the second modulation/demodulation unit 23.
20. The second modulation/demodulation unit 23 modulates the signals transmitted from the second processing unit 26 and transmits to the second radio transmitting and receiving unit 21.
21. The second radio transmitting and receiving unit 21 emits the modulated signals through the second antenna 22.
22. Return to Step 18.

By means of the techniques and constructions set forth above, the mobile phone and hand-free handset may be communicated in a wireless fashion without physical linking lines, and may be used more conveniently.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

I claim:

1. A transfer connection device for wirelessly connecting a mobile phone and a hand-free handset, comprising:
    a first connector coupling with the mobile phone; and
    a second connector coupling with the hand-free handset for transmitting signals between the mobile phone and the hand-free handset through the first connector and the second connector in a wireless fashion, wherein the first connector includes a first radio transmitting and receiving unit, a first antenna, a first modulation/demodulation unit, a first control unit, a first memory unit, a first processing unit, and a first connection interface; wherein
    the first radio transmitting and receiving unit is controlled by the first control unit for receiving radio signals from the second connector and for emitting signals output by the first modulation/demodulation unit through the first antenna to the second connector;
    the first antenna receives and transmits radio signals;
    the first modulation/demodulation unit is controlled by the first control unit to modulate output signals from the first processing unit and transfer to the first radio transmitting and receiving unit, and to demodulate radio signals received from the first radio transmitting and receiving unit and transfer to the first processing unit for processing;
    the first control unit controls and coordinates all other units in the first connector;
    the first memory unit stores set values of the first connector and temporarily stores the received and transmitted radio signals;
    the first processing unit is controlled by the first control unit for processing audio voice and control data of the mobile phone and providing to the first modulation/demodulation unit; and
    the first connection interface allows a signal terminal of the mobile phone connecting the first connector, and is selectively a signal line or a socket.

2. A transfer connection device for wirelessly connecting a mobile phone and a hand-free handset, comprising:
    a first connector coupling with the mobile phone; and
    a second connector coupling with the hand-free handset for transmitting signals between the mobile phone and the hand-free handset through the first connector and the second connector in a wireless fashion, wherein the second connector includes a second radio transmitting and receiving unit, a second antenna, a second modulation/demodulation unit, a second control unit, a second memory unit, a second processing unit, and a second connection interface; wherein:

the second radio transmitting and receiving unit is controlled by the second control unit for receiving radio signals from the first connector and emitting signals output by the second modulation/demodulation unit through the second antenna to the first connector;

the second antenna receives and transmits radio signals;

the second modulation/demodulation unit is controlled by the second control unit to modulate output signals from the second processing unit and transfer to the second radio transmitting and receiving unit, and to demodulate radio signals received from the second wireless transmitting and receiving unit and transfer to the second processing unit for processing;

the second control unit controls and coordinates all other units in the second connector;

the second memory unit stores set values of the second connector and temporarily stores the received and transmitted radio signals;

the second processing unit is controlled by the second control unit for processing audio voice and control data of the hand-free handset and transferring to the second modulation/demodulation unit; and the connection interface allows a signal terminal of the hand-free handset connecting the second connector, and is selectively a signal line or a socket.

* * * * *